MULTIPLEX TRANSMISSION SYSTEMS

Filed Dec. 29, 1960 4 Sheets-Sheet 1

INVENTOR
T. R. MEEKER
BY John K. Mullarney
ATTORNEY

INVENTOR
T. R. MEEKER
BY John K. Mullarney
ATTORNEY

INVENTOR
T. R. MEEKER
BY John K. Mullarney
ATTORNEY

MULTIPLEX TRANSMISSION SYSTEMS

Filed Dec. 29, 1960 4 Sheets-Sheet 4

INVENTOR
T. R. MEEKER
BY John K. Mullarney
ATTORNEY 3,512,160

MULTIPLEX TRANSMISSION SYSTEMS

Thrygve R. Meeker, Whippany, N.J., assignor to Bell Telephone Laboratories, Incorporated, New York, N.Y., a corporation of New York Filed Dec. 29, 1960, Ser. No. 79,458
Int. Cl. H04j *3/04*
U.S. Cl. 343—200 11 Claims This invention relates to multiplex transmission systems and particularly to such systems wherein multiplexing is achieved by subjecting the signals of different sources to different disperse-collapse, frequency-delay characteristics.

It is often desirable to transmit a plurality of signals, in digital data form, over a common communication facility, and yet recover the signals separately from the common communication facility for subsequent separate utilization. Communication systems for handling signals in this way are well known in the prior art and are commonly referred to as multiplex systems.

In such systems the common communication facility, through which the plurality of signals are transmitted, may take the form of a radio link, a coaxial cable, a wire line, et cetera.

The transmission of digital data signals over a common communication facility has, heretofore, been most advantageously carried out using time division multiplexing. As the name implies, the single communication facility is effectively divided into a plurality of message channels on a time division basis. This is accomplished by interposing or "inter-lacing" the message pulses of other signal sources in the intervals between the pulses required for the transmission of a single message. This sequential or time sharing type of transmission results, of course, in a concomitant reduction in the speed with which each of the messages can be communicated. The present invention enables the processing of a plurality of signals through a common communication facility simultaneously, rather than sequentially, and thus enables a large order increase in the speed and efficiency with which a plurality of signals can be communicated.

It is a primary object of the present invention to simultaneously transmit a plurality of signals in a common communication facility and separately recover the same thereafter.

It is a further object to provide improved multiplex transmission apparatus in which a plurality of digital data message signals can be processed in a common communication facility without time sharing.

In multiplex systems of the type mentioned above, relatively complex circuits have been required at the receiving station to distribute the inter-laced pulses of the several messages to the appropriate output circuits and to synchronize the operation of the receiving equipment with that of the transmitting equipment to insure that such a distribution is maintained. Such circuits, of course, add to the complexity of the equipment and to a certain extent reduce its reliability, since failure of the synchronizing circuits disrupts the entire system.

It is a further object of the present invention to provide a simplified multiplex transmission system having increased reliability.

In accordance with the present invention, pulse type message signals from a plurality of sources are each dispersed by a dispersive delay line system prior to their simultaneous transmission over a common communication facility. The signals in the common facility are "smeared" into overlapping relationships with each other. At the receiving end, the signals are collapsed by similar delay line systems. The disperse and collapse systems of each channel have complementary delay versus frequency characteristics. Hence, the message signal from any one signal source in passing through its two complementary delay systems is delayed, but this delay is substantially constant over the frequency band of interest (i.e., the total delay is non-dispersive). However, the disperse-collapse, delay versus frequency characteristics of each channel are unique, and therefore only the desired pulse signals will be entirely or completely collapsed by any one collapse system. The unwanted pulse signals of the other signal sources remain dispersed, to varying extents, and thus will be at a detectable level below the desired pulse signals.

In one specific embodiment of the present invention the shape of the dispersion and/or collapse characteristics can be adjusted electronically. This permits a great deal of flexibility, and signals from a given source can be routed alternatively to different receivers by simple electronic adjustment.

For a clearer understanding of the nature of the invention and the additional advantages and objects thereof, reference is made to the following detailed description taken in connection with the accompanying drawings in which.

Figure 1:
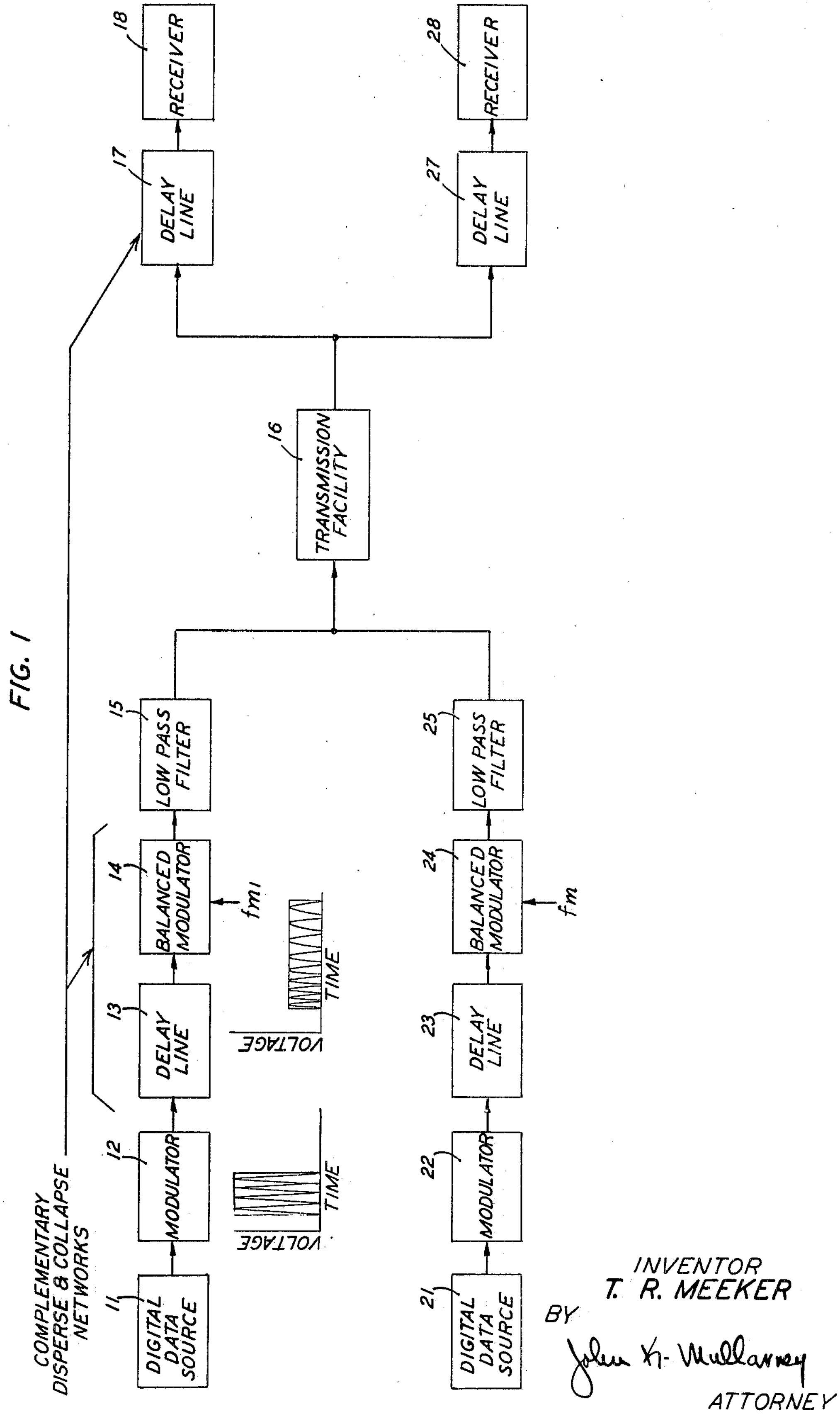
FIG. 1 is a schematic diagram in block form of a multiplex transmission system in accordance with the present invention.

Referring now to FIG. 1 of the drawings, the output, pulse type, message signals of digital data source 11 are delivered to the input of a first delay line 13 via modulator 12. This delay line may comprise any of the various type lines known in the art to provide a dispersive delay (i.e., a delay that is a function of frequency). Elongated ultrasonic delay lines of various cross-sectional configurations have been used heretofore to this end. Ultrasonic lines, quite satisfactory for this purpose, have been disclosed by applicant in the article entitled "Dispersive Ultrasonic Delay Lines Using the First Longitudinal Mode in a Strip," I.R.E. Transactions on Ultrasonics Engineering, vol. UE–7, No. 2, June 1960, pages 53–58. The delay lines of the article provide typical delay versus frequency characteristics such as illustrated by the curve 31 of FIG. 2A.

The modulator 12, sometimes termed a driver, transforms the digital data signals into a form usable by the delay line 13. That is, if the frequency components of the pulse signals to be delayed do not match or fit the bandwidth characteristics of the delay line utilized, it is common practice to first modulate the same with an alternating current signal to thereby produce new pulse signals having the desired frequency shifted spectrum. Furthermore, in the instant case for example, to operate about the inflection point ($f_i$) of the delay versus frequency characteristic curve 31, the modulation frequency should be set to a value such that the signals delivered to the delay line having a center frequency equal to the inflection point frequency.

As will be clear to those in the art, the alternating-current pulse signals delivered to the delay line 13 will be elongated or smeared in accordance with the dispersive delay characteristics of the line. This elongation of the pulses is exemplified in FIG. 1 by the illustrations of an alternating-current pulse entering and leaving the delay line. The elongation or "spreading-out" of the input pulse signal is necessarily accompanied by a decrease in the amplitude of the same. That is, a high amplitude input pulse will appear, after dispersion, as an elongated pulse of reduced amplitude. And the amount of reduction in amplitude is a direct function of the amount of dispersion experienced by the pulse. This concomitant reduction in pulse amplitude that accompanies the dispersion of the same is well known to those in the art. As further indicated by the illustration of the dispersed pulse signal and as will be clear from the typical characteristic curve 31 of FIG. 2A, the high frequency components in the input signal are delayed the most, and the low frequency components least.

The pulse signals dispersed in delay line 13 are next delivered to the balanced modulator 14 along with a modulation voltage of frequency $f_{m1}$. The balanced modulator performs in standard fashion producing sum and difference signals, while suppressing the "feed-through" signals from delay line 13. The output of modulator 14 is delivered to a low pass filter 15 whose cutoff is at least equal to frequency $f_{m1}$. The filter thus passes the aforementioned difference signals, which of course are less than $f_{m1}$, and blocks the modulation sum signals.

The modulation performed in modulator 14 serves to transpose the frequency components that make up the dispersed pulse signals. For present purposes of explanation a relatively simple arrangement will be assumed. For example, the delay line 13 can be assumed to have a delay versus frequency characteristic such as illustrated by curve 31 of FIG. 2A. The curve 31 is symmetrical about the inflection point frequency $f_{i1}$ and symmetrical operation about this point will be assumed. As indicated previously, operation about a particular point is determined by the frequency setting of modulator 12.

The high frequency components of the input pulse signals are delayed the most and the low frequency components least, with the intermediate frequency components being subjected to varied delays in accordance with the shape of the delay versus frequency characteristic over the frequency band of operation. Accordingly, the frequency distribution of a dispersed pulse can be represented as follows:

$$\underset{f_2}{|}\overset{\Delta f}{\rule{2em}{0.4pt}}\underset{f_{i1}}{|}\overset{\Delta f}{\rule{2em}{0.4pt}}\underset{f_1}{|}$$

The horizontal line represents the length of the dispersed pulse, the frequency $f_{i1}$ is the midband inflection point frequency, the frequency $f_1$ is the low frequency component that is delayed the least, the frequency $f_2$ is the high frequency component and hence is delayed most, and $\Delta f$ represents the frequency difference between the midband frequency $f_{i1}$ and frequencies $f_1$ and $f_2$.

If the modulation frequency $f_{m1}$ is now assumed to be equal to twice the midband frequency $f_{i1}$ (i.e., $f_{m1}=2f_{i1}$), the dispersed pulse after modulation will have a frequency distribution as follows:

$$\underset{f_1}{|}\rule{2em}{0.4pt}\underset{f_{i1}}{|}\rule{2em}{0.4pt}\underset{f_2}{|}$$

where the horizontal line again represents the length of the dispersed pulse. Since $f_{m1}=2f_{i1}$, the midband frequency of this disperse pulse is the same as before ($f_{m1}-f_{i1}=2f_{i1}-f_{i1}=f_{i1}$). However, the high and low frequency components are transposed.

The high frequency component $f_2$ of the dispersed pulse, from delay line 13, can be expressed as follows:

$$f_2=f_{i1}+\Delta f$$

When this frequency component is beat with $f_{m1}$, the difference frequency is:

$$f_{m1}-f_2$$

Substituting:

$$2f_{i1}-(f_{i1}+\Delta f)=$$
$$2f_{i1}-f_{i1}-\Delta f=$$
$$f_{i1}-\Delta f=f_1$$

In similar fashion:

$$f_1=f_{i1}-\Delta f$$

And the difference frequency is:

$$f_{m1}-f_1=$$
$$2f_{i1}-(f_{i1}-\Delta f)=$$
$$2f_{i1}-f_{i1}+\Delta f=$$
$$f_{i1}+\Delta f=f_2$$

Accordingly, the frequencies comprising the dispersed pulse are transposed and the low frequencies are now delayed most and the high frequencies delayed least.

Figure 2A:
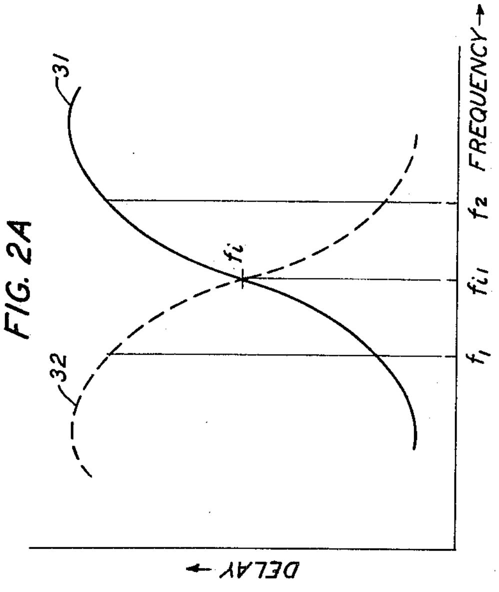
FIGS. 2A and 2B illustrate the disperse and collapse, delay versus frequency characteristics of a communication channel.

The net result of the above-described modulation process is that the alternating-current pulse signals that are dispersed in delay line 13 in accordance with the frequency-delay curve 31 appear, in effect, to have been dispersed in accordance with the dotted curve 32 of FIG. 2A. Curve 32 constitutes a transposed mirror image of curve 31.

Figure 2B:
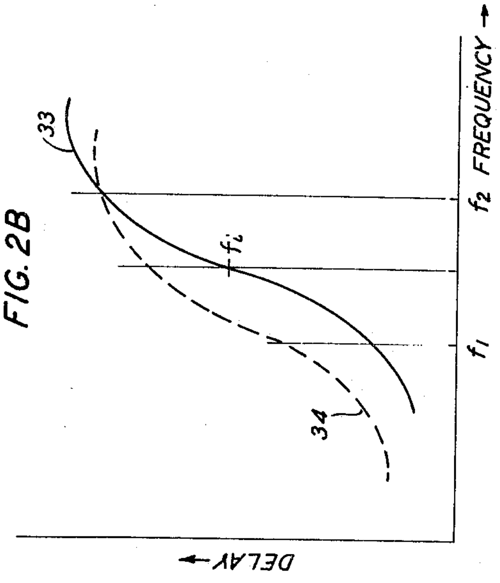

The dispersed pulse signals, passed by filter 15, are next delivered to the transmission facility 16, which as mentioned heretofore, may comprise a radio link, a coaxial cable, a wire line, et cetera. The output of transmission facility 16 is coupled to the input of delay line 17 which, for present purposes, can be assumed to possess a delay versus frequency characteristic such as illustrated by curve 33 in FIG. 2B. The curve 33 is substantially identical to curve 31, and for the case assumed above ($f_{m1}=2f_1$) the inflection point frequencies of the two curves are equal.

If the curves 32 and 33 are compared, it will be seen that they complement each other over the frequency band of interest ($f_1$ to $f_2$). Thus, the total or over-all delay time will be the same for all frequencies within the band of interest. Accordingly, the delay line 17 will collapse, completely, the dispersed pulse signals from the delay line 13-modulator 14 combination, and although the digital data signals are subjected to an over-all delay they are otherwise unchanged. This collapsing is just the reverse of the dispersion process heretofore described and therefore a concomitant increase in pulse amplitude accompanies the collapsing of the desired, dispersed, pulse signals.

The pulse signals of other signal sources are dispersed in accordance with other and different delay versus frequency characteristics and thus when these unwanted signals are coupled to delay line 17 along with the desired signals of source 11, they will not be collapsed in the described manner and will therefore be at a detectable level below the desired signals. Accordingly, the receiver 18 should include an amplitude threshold circuit, or the like, to discriminate the desired from the undesired data signals.

If the disperse-collapse, delay versus frequency characteristics are unique for each channel, the digital data sources will be operatively coupled only to their respective receivers. For example, the delay line 27 of the other channel shown in FIG. 1 can be designed to provide a delay versus frequency dependence such as illustrated by the dotted curve 34 of FIG. 2B. If this curve is compared with the curve 32, it will be seen that they do not complement each other and thus the dispersed pulse signals of source 11 will not be entirely collapsed in delay line 27. These signals remain dispersed to some degree and thus at a detectable level below the desired signals from digital data source 21.

The other channel shown in FIG. 1 comprises source 21, modulator 22, delay line 23, balanced modulator 24, filter 25, delay line 27 and receiver 28. As mentioned heretofore, the disperse-collapse characteristics of this second channel are significantly different from that of the first described channel; otherwise this channel is similar in operation to the first described channel. This being so, a detailed description of the operation of this second channel is not considered necessary.

Although FIG. 1 shows only a pair of channels, it will be clear to those in the art that multiple data sources can be operatively connected to respective receivers via a common transmission facility in accordance with the principles of the present invention. The dispersed pulse signals of the various sources are transmitted simultaneously in transmission facility 16 and although they are smeared into overlapping relationships with each other, they can be separately recovered thereafter in accordance with the invention.

In the foregoing explanatory description, it was assumed, for ease in explanation, that the delay versus frequency characteristics of delay lines 13 and 17 were substantially identical, that they were symmetrical about the inflection point, that the inflection point frequencies were the same, and that the operating frequency band was centered symmetrically about the inflection point frequency of the two lines. As will be clear hereinafter, none of these assumed conditions are essential for satisfactory operation of the present invention.

Figure 3:
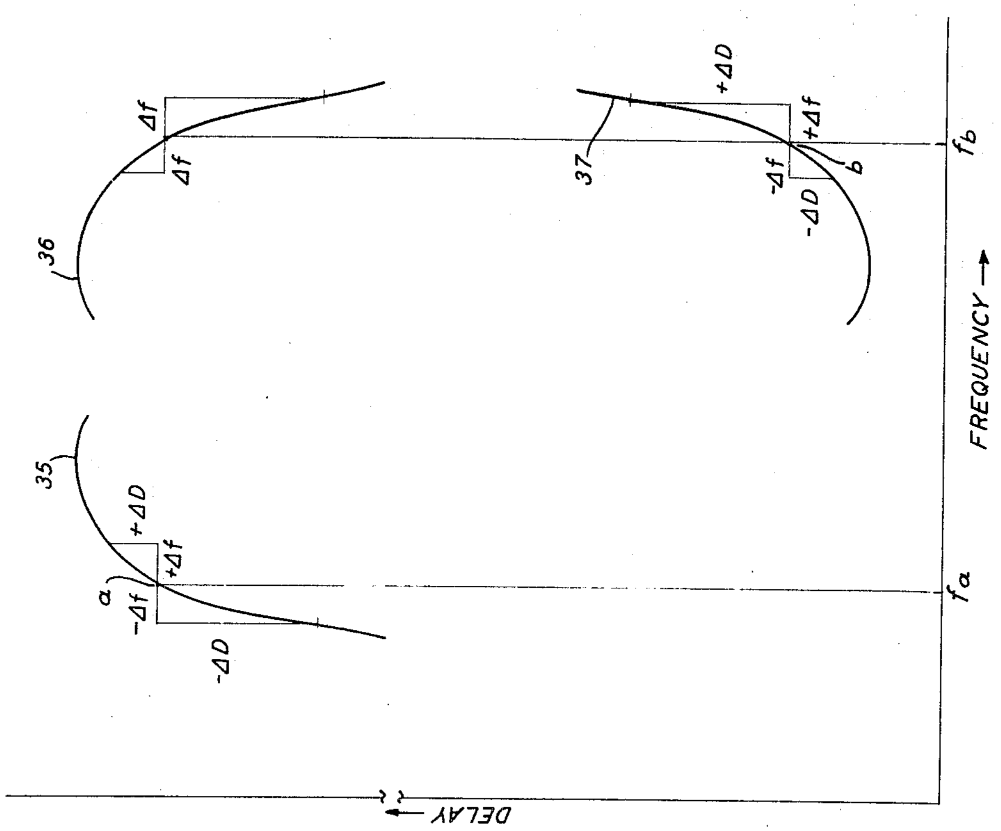
FIG. 3 shows curves useful in further explanation of the multiplex transmission system of FIG. 1.

Turning now to FIG. 3, the parameters of delay line 13 can be readily chosen to provide a delay versus frequency dependence such as shown by the curve 35. And with modulator 12 set to provide a center frequency, for the data signals, equal to $f_a$, operation will take place about the point *a* on curve 35.

Similarly, the parameters of delay line 17 can be readily chosen to provide a delay versus frequency dependence such as illustrated by the curve 37 in FIG. 3. As will be clear to those in the art, changes in the length (L), the thickness ($h$), the Poisson's ratio ($\sigma$) of the material, and the like, all effect changes in the slope, curvature and frequency range of the dispersive delay characteristic. In the copending application of A. H. Fitch, Ser. No. 69,418, filed Nov. 15, 1960, a variation in one of the parameters of a strip delay line is shown to provide numerous variations in the slope, curvature and bandwidth of the dispersive delay characteristic.

Now, if the frequency $f_{m1}$ of balanced modulator 14 is set at a value equal to the sum of the frequencies $f_a$ and $f_b$, operation about the point *b* of curve 37 is assured. For example, if $f_{m1}=f_a+f_b$, the difference signals from modulator 14 will have a center frequency of $f_b[f_{m1}-f_a=(f_a+f_b)-f_a=f_b]$. Also, as explained heretofore, this modulation process will transpose the frequency components of the dispersed pulses. The net result, therefore, of the modulation process is that the alternating-current pulse signals dispersed in delay line 13 in accordance with the frequency-delay curve 35 appear, in effect, to have been dispersed in accordance with the curve 36 of FIG. 3. Curve 36 constitutes a transposed, frequency shifted, mirror image of curve 35, over the frequency band of interest.

If the curves 36 and 37 are compared, it will be seen that they complement each other over the frequency band of interest ($f_b\pm\Delta f$). Thus, the total or over-all delay will be the same for all frequencies within the band of interest.

The delay versus frequency characteristic curves 35 and 37 need not be identical nor need they necessarily be symmetrical about their respective inflection points. The inflection points, if any, of curves 35 and 37 are of course at different frequencies and neither of the operating points *a* and *b* are even near an inflection point. All that is necessary in this regard is that the differential delay ($+\Delta D$) of curve 35 for frequencies greater than $f_a$ (i.e., $f_a+\Delta f$) be equal to the differential delay ($-\Delta D$) of curve 37 for frequencies less than $f_b$ (i.e., $f_b-\Delta f$), and the differential delay ($-\Delta D$) for frequencies less than $f_a$ ($f_a-\Delta f$) be equal to the differential delay ($+\Delta D$) for frequencies greater than $f_b$ ($f_b+\Delta f$), over the frequency range of interest.

Figure 4:
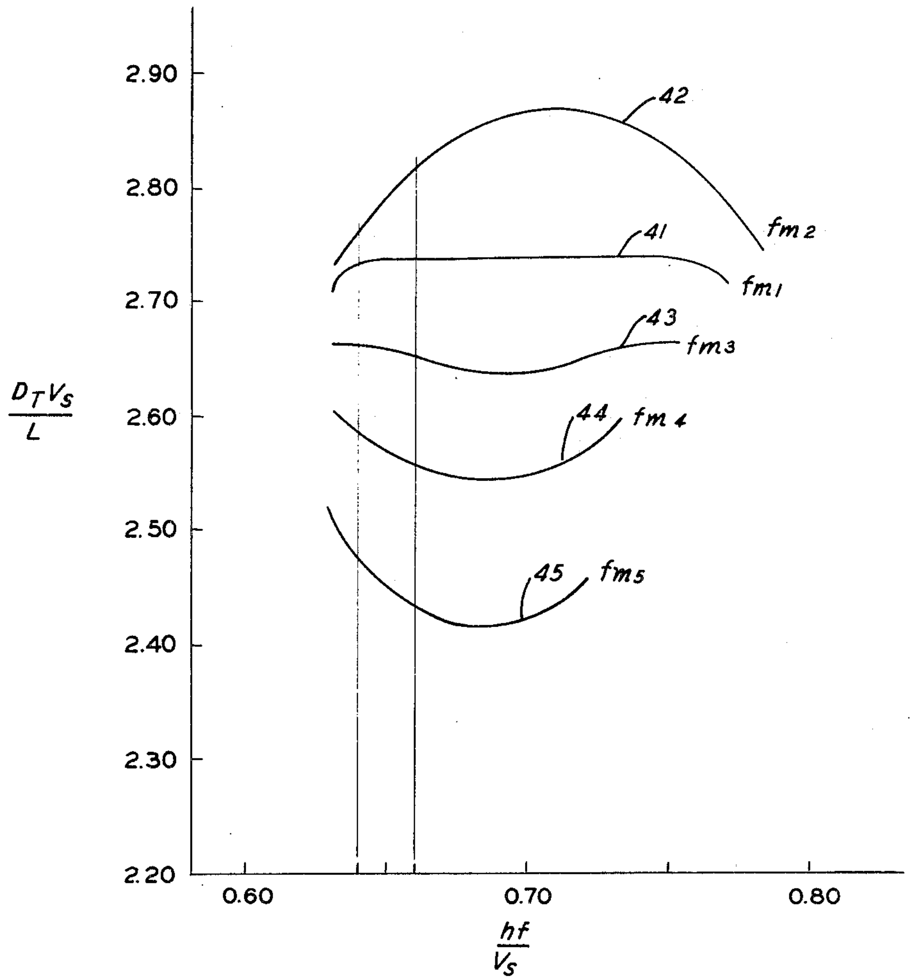
FIG. 4 shows typical over-all disperse-collapse frequency-delay characteristic curves.

The curves of FIG. 4 show the dependence of total dimensionless delay ($D_tV_s/L$) on dimensionless frequency ($hf/V_s$) for a simplified disperse-collapse system, such as described heretofore, using different values of modulation frequency $f_m$. The values of $h$, L and $V_s$ are of course constant for any given disperse-collapse system. The curve 41 represents the aforementioned desired situation where over-all delay is constant or nearly so over a given range of frequencies. In this instance, the modulation frequency $f_{m1}$ is set at the proper value to insure complementary delays in the disperse and collapse networks.

However, at modulation frequencies removed from $f_{m1}$, the total or over-all delay is seen to be dispersive. The curve 42 illustrates the effect on total delay of an increased $f_m$ (i.e., $f_{m2}>f_{m1}$); and curves 43, 44 and 45 illustrate the characteristics for successively smaller values of $f_m$. Accordingly, the dispersion, if any, and the degree thereof can be controlled by adjustment of the modulation frequency $f_m$.

Figure 5:
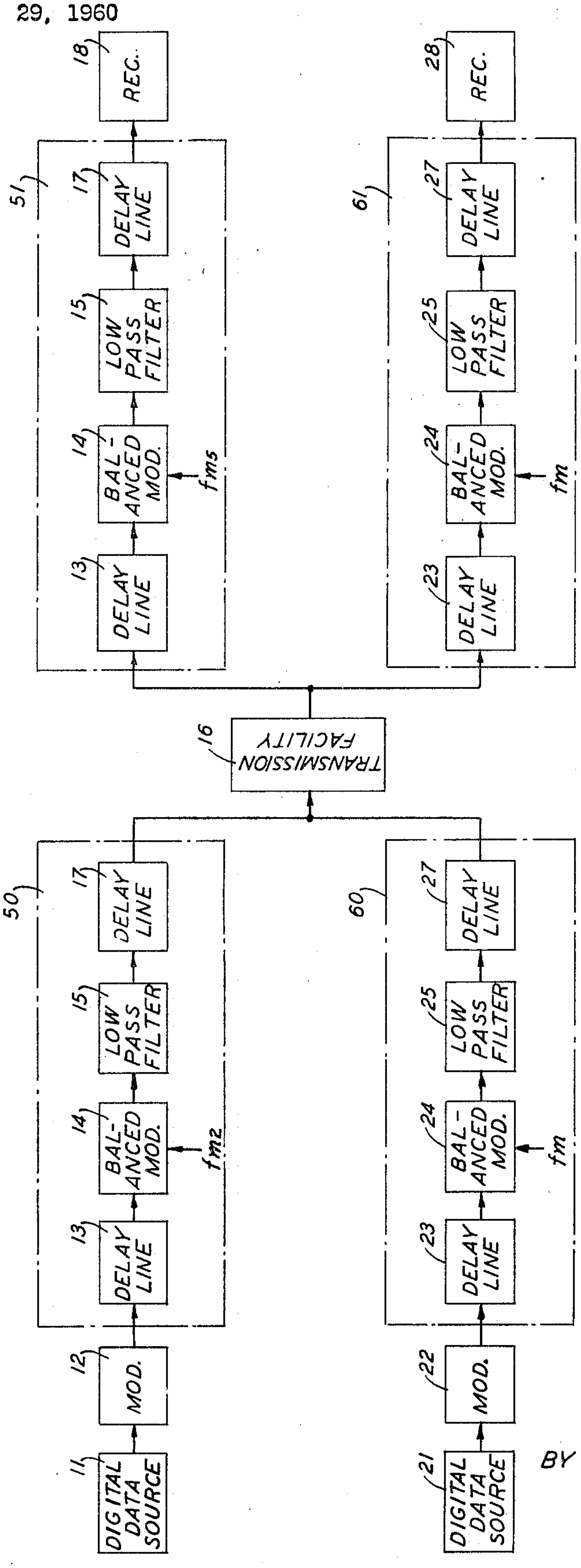
FIG. 5 is a schematic diagram in block form of another embodiment of the present invention.

Dispersive characteristic curves of the type shown in FIG. 4 are used to advantage in the FIG. 5 modification of the invention. This modification relies on the fact that a concave-up curve (e.g., curve 45 of FIG. 4) can be arrived at that substantially matches or complements a concave-down curve (e.g., curve 42) over a given frequency band.

Turning now to FIG. 5, wherein the components of a nature similar to the corresponding components in FIG. 1 are similarly designated, the output, pulse type, message signals of digital source 11 are delivered to the input of a first delay line 13 via modulator 12. As stated previously, modulator 12 transforms the digital data signals into a form usable by the delay line 13. The pulse signals dispersed in delay line 13 are delivered to the balanced modulator 14 along with a modulation voltage of frequency $f_{m2}$. The output of modulator 14 is fed to a low pass filter 15, whose cutoff is at least equal to frequency $f_{m2}$, and thence to a delay line 17. The lines 13 and 17 can have individual frequency-delay characteristics such as shown by the curves 31 and 33 of FIGS. 2A and 2B. However, the modulation frequency $f_{m2}$ will, in this instance, be at a value higher than that utilized in the FIG. 1 arrangement ($f_{m2}>f_{m1}$). Accordingly, the delay system 50, comprising delay lines 13 and 17 and modulator 14, will have a total delay characteristic that is dispersive (such as curve 42 of FIG. 4) rather than non-dispersive or constant (such as curve 41 of FIG. 4).

The dispersed pulse output from line 17 is delivered to the transmission facility 16, along with the message signals of the other channels. The output of facility 16 is couped to the delay system 51 which likewise comprises a pair of delay lines 13 and 17 and a modulator 14. These latter delay lines can likewise have similar frequency-delay characteristics. However, in this instance, the modulation frequency $f_{m5}$ will be at a value lower than that utilized in the FIG. 1 arrangement. Accordingly, the total delay characteristic of delay system 51 will be dispersive, and of a configuration such as shown by the curve 45 of FIG. 4.

If the curves 42 and 45 are compared, it will be seen that they complement each other over the dimensionless frequency ($hf/V_s$) range of .64 to .66. Thus, the total delay of the channel, comprising delay systems 50 and 51, is a constant over this range. Accordingly, the delay system 51 will collapse, completely, the dispersed pulse signals from delay system 50.

In both of the described modifications the frequency range of operation is determined by the range over which the delay characteristic curves complement each other. And this frequency range of operation, in turn, sets the limits on the frequency components that make up the message pulse signals. That is, the frequency range of operation determines pulse width.

The other channel shown in FIG. 5 comprises source 21, modulator 22, delay systems 60 and 61, and receiver 28. The delay systems 60 and 61 of this channel have respective concave-down and concave-up dispersive characteristics, or vice versa, that are detectably different from those of the first described channel. For example, delay system 60 can have a total delay characteristic such as that shown by the curve 45 of FIG. 4. This characteristic is of course the same as that of delay system 51 and therefore the pulse signals from delay system 60 that are dispersed in accordance with characteristic curve 45 will, when delivered to the delay system 51, be dispersed even further. The delay system 61 would, in this instance, have a delay characteristic such as shown by the curve 42. The curves 42 and 45 are complementary for the indicated range of operation and hence the signals of source 21 will be operatively coupled to receiver 28.

Although FIG. 5 shows only a pair of channels, it will be clear to those in the art that multiple data sources can be operatively connected to respective receivers via a common transmission facility in accordance with the principles of the present invention. These other operatively connected channels can utilize other and different complementary characteristic curves than those illustrated in FIG. 4. As suggested in FIG. 4, numerous concave-up and concave-down dispersive delay characteristics can be realized through the simple expedient of varying the modulation frequency $f_m$.

Since the dispersion and collapse characteristics can be varied electronically, as heretofore described with regard to FIGS. 4 and 5, numerous arrangements can be envisioned wherein the message signals of one or more sources can be routed alternatively to different receivers by simple electronic adjustment. For example, assume the delay system 50 of FIG. 5 provides a dispersive delay such as illustrated by the curve 42 of FIG. 4. Further, as mentioned heretofore, the delay system 51 can be designed to provide a dispersive delay characteristic such as shown by the curve 45 of FIG. 4, for a given modulation frequency ($f_{m5}$). The curves 42 and 45 are complementary over a limited band of dimensionless frequency ($hf/V^s$). If the delay lines 23 and 27 of delay system 61 are substantially identical to the delay lines 13 and 17 but the modulation frequency of system 61 is set at a value of $f_{m4}$, a dispersive delay characteristic such as illustrated by curve 44 will be obtained. This latter characteristic is not complementary to curve 42 over the indicated band of operation, and hence the pulse signals dispersed by delay system 50 will not be completely collapsed by delay system 61 and they can, therefore, be discriminated against on an amplitude basis. The source 11 is thus operatively connected to receiver 18 only.

If, however, the modulation frequencies of delay systems 51 and 61 are now switched and the modulation frequency of system 51 is set at $f_{m4}$ and the modulation frequency of system 61 is set at $f_{m5}$, the message signals of source 11 will be routed or operatively coupled to receiver 28 only. Thus, the signals of digital data source 11 can be routed alternatively to either receiver 18 or receiver 28 by simple electronic control.

Further, if the parameters of delay system 60 are chosen to provide a dispersive delay characteristic that complements the characteristic curve 44 over the band of operation, the signals of source 21 will be coupled to receiver 28, prior to the aforementioned switching. However, when the modulating frequencies of systems 51 and 61 are switched, the message signals of source 21 will be switched to receiver 18. The digital data sources 11 and 21 can thus be respectively coupled to receivers 18 and 28, or alternatively to receivers 28 and 18.

The dimensionless delay versus dimensionless frequency curves can be obtained using lines of other cross sectional longitudinal type strip delay lines having a Poisson's ratio of 0.350. The curves 41 through 45 correspond to values of $hf_m/V_s$ of 1.400, 1.420, 1.385, 1.370, and 1.350, respectively. These curves, however, are typical and similar curves can be obtained using lines of other cross sectional configurations and other values of Poisson's ratio.

It should be clear at this point that the above-described embodiments are merely illustrative of the principles and application of the present invention. Numerous other arrangements and modifications can be devised by those skilled in the art without departing from the spirit and scope of the invention.

What is claimed is:

1. A multiplex transmission system comprising a plurality of pulse signal sources, dispersive delay means for each of said sources having a delay versus frequency characteristic which is significantly different from that of the dispersive delay means associated with each of the other sources, a pulse transmission facility, means for applying the dispersed pulses from said dispersive means to said facility, a plurality of receivers, and means for distributing pulses from said facility to individual receivers comprising collapse delay means for each of said receivers having a unique delay versus frequency characteristic which is complementary over a given frequency range to that of the dispersive delay means of one of said sources.

2. A multiplex transmission system comprising a plurality of pulse signal sources, a plurality of dispersive delay means respectively coupled to each of said sources for dispersing the frequency components of the pulse signals of each source in a manner that is significantly different from the dispersion of the frequency components of the pulse signals of each of the other sources, a pulse transmission facility, means for simultaneously applying the dispersed pulses from the plurality of dispersive delay means to said facility, a plurality of collapse delay means coupled to the output of said transmission facility for respectively collapsing the frequency components of the pulse signals of each source in a manner that complements the dispersion thereof, and a plurality of receivers respectively coupled to the output of said collapse delay means.

3. A multiplex transmission system comprising a plurality of pulse signal sources, dispersive delay means for each of said sources having a delay versus frequency characteristic that is significantly different from that of the dispersive delay means associated with each of the other sources, a pulse transmission facility, means for simultaneously applying the dispersed pulses from said dispersive means to said facility, a plurality of receivers, and a plurality of collapse delay means respectively intercoupling each of said receivers to the output of said facility, the collapse delay means associated with each receiver having a delay versus frequency characteristic which is complementary over a given frequency range to that of the dispersive delay means of a predetermined one of said sources.

4. A multiplex transmission system as defined in claim 3 wherein the disperse and collapse delay means include means for electronically varying the delay versus frequency characteristics thereof.

5. A multiplex transmission system comprising first and second pulse signal sources, a delay line for each source having a predetermined dispersive delay versus frequency characteristic, means for modulating the dispersed pulse signals from each delay line with respective signals of selected frequency, the difference signals of each modulation having different frequency dispersion characteristics, a pulse transmission facility, means for simultaneously applying the difference signals of each modulation process to said facility, a second pair of delay lines each coupled to the output of said transmission facility, each of said second pair of delay lines having a delay versus frequency collapse characteristic that complements one of the aforementioned different frequency dispersion characteristics, and a pair of receivers respectively coupled to the output of said pair of delay lines.

6. A multiplex transmission system as defined in claim 5 wherein said delay lines are of the ultrasonic type.

7. A multiplex transmission system as defined in claim 5 wherein the modulation signals are of different selected frequencies.

8. A multiplex transmission system as defined in claim 7 wherein the modulating means each comprises a balanced modulator, and a low pass filter having a cutoff frequency at least equal to the modulation frequency.

9. A multiplex transmission system comprising first and second pulse signal sources, an ultrasonic delay line for each source having a dispersive delay versus frequency characteristic that is significantly different from that of the delay line associated with the other source, means for modulating the output signals from each delay line with respective signals of selected frequency to alter the dispersion thereof in accordance with other dispersive delay versus frequency characteristics that are likewise significantly different from each other, a pulse transmission facility, means for coupling the modulated dispersed pulses from said modulating means to said facility, a pair of receivers, and a second pair of ultrasonic delay lines respectively intercoupling said receivers with the output of said facility, the ultransonic delay line associated with each receiver having a delay versus frequency characteristic that is complementary over a given frequency range to a predetermined one of said other dispersive delay versus frequency characteristics.

10. A multiplex transmission system comprising first and second pulse signal sources, electronically adjustable dispersive delay means respectively coupled to each of said sources for dispersing the pulse signals of each of said sources in accordance with distinct delay versus frequency characteristics, a pulse transmission facility, means for simultaneously applying the dispersed pulses from said dispersive means to said facility, a pair of receivers, a pair of collapse delay means respectively intercoupling each of said receivers to the output of said facility, and means for electronically adjusting the delay versus frequency characteristics of the collapse means associated with each receiver to bring the same into complement with one of said distinct delay versus frequency characteristics over a given frequency range.

11. A multiplex transmission system as defined in claim 10 wherein the disperse and collapse delay means each comprises in tandem a first ultrasonic dispersive delay line, a modulator having an adjustable modulation frequency and a second ultrasonic dispersive delay line.

References Cited

UNITED STATES PATENTS

| | | | |
|---|---|---|---|
| 2,670,404 | 2/1954 | Chireix | 343—200 |
| 2,835,889 | 5/1958 | Dyer et al. | 343—200 |
| 2,933,702 | 4/1960 | Bogert | 333—29 |
| 2,982,852 | 5/1961 | Fano | 250—6.9 |
| 2,678,997 | 5/1954 | Darlington | 333—14 |
| 2,840,640 | 6/1958 | Babcock | 343—200 |

R. D. BENNETT, Primary Examiner

C. H. WANDS, Assistant Examiner

U.S. Cl. X.R.

179—15; 333—14